United States Patent [19]

Anderson et al.

[11] 3,988,630

[45] Oct. 26, 1976

[54] LEAD WIRE FORMING APPARATUS FOR INCANDESCENT FILAMENTS

[75] Inventors: Harold G. Anderson, Kirtland; Robert E. Louden, Youngstown, both of Ohio

[73] Assignee: General Electric Company, Schenectady, N.Y.

[22] Filed: July 11, 1975

[21] Appl. No.: 595,271

[52] U.S. Cl. .............................. 313/331; 29/33 M; 29/25.15; 313/333; 313/271; 313/274

[51] Int. Cl.$^{2}$ .............................. H01G 5/50

[58] Field of Search ........... 313/331, 333, 271, 274, 313/343, 344; 29/33 M, 25.15

[56] References Cited

UNITED STATES PATENTS

| | | | |
|---|---|---|---|
| 1,013,914 | 1/1912 | Whitney | 313/333 X |
| 1,082,587 | 12/1913 | Greengard | 313/333 X |
| 2,145,186 | 1/1939 | Meeker et al. | 313/333 |
| 2,315,504 | 4/1963 | Curtis | 313/333 X |
| 2,329,769 | 9/1943 | Kinyon | 313/333 X |
| 2,632,126 | 3/1953 | Curtis | 313/333 X |
| 3,040,204 | 6/1962 | Belknap | 313/331 X |

*Primary Examiner*—Saxfield Chatmon, Jr.
*Attorney, Agent, or Firm*—Paul F. Wille; Lawrence R. Kempton; Frank L. Neuhauser

[57] ABSTRACT

An improved lead wire forming apparatus is described comprising wire flattening apparatus, a three jaw hook former, and clamping dies for fastening the lead wire about a filament.

12 Claims, 13 Drawing Figures

*Fig. 1A*
PRIOR ART
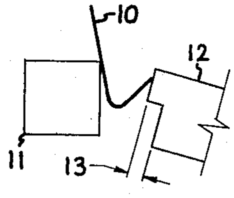
*Fig. 1B*
PRIOR ART
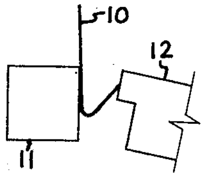
*Fig. 1C*
PRIOR ART
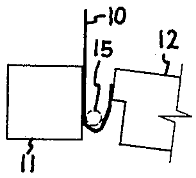
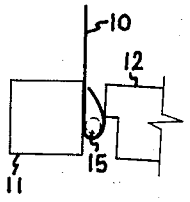
*Fig. 1D*
PRIOR ART
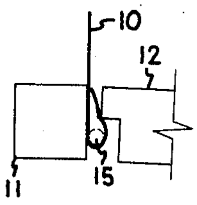
*Fig. 1E*
PRIOR ART
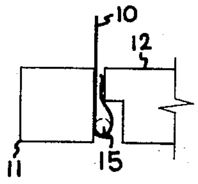
*Fig. 1F*
PRIOR ART Fig. 2A
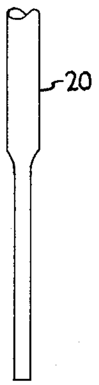
Fig. 2B
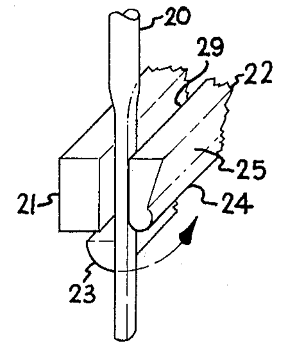
Fig. 2C
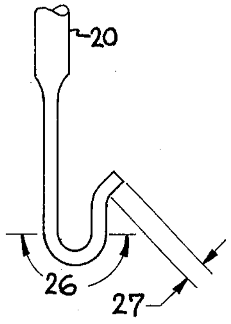
Fig. 2D
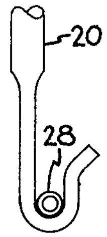
Fig. 2E
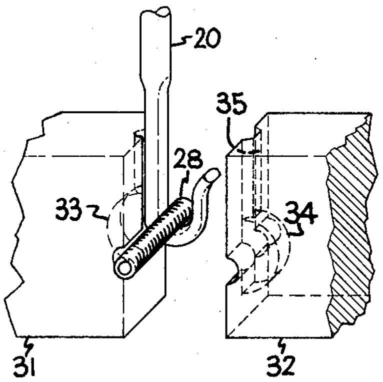
Fig. 2F
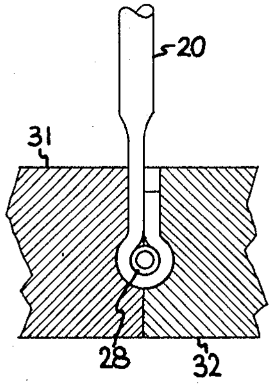
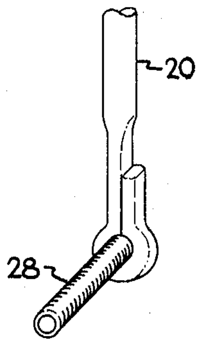
Fig. 3

LEAD WIRE FORMING APPARATUS FOR INCANDESCENT FILAMENTS

BACKGROUND OF THE INVENTION

This invention relates to the manufacture of incandescent lamps and, in particular, to apparatus for fastening lead wires to incandescent filaments, especially coiled filaments.

In the prior art, lead wires were flattened, given an initial bend with clamping jaws, received a filament while in the clamping jaws, and then clamped around the filament using the filament as an anvil in the same clamping jaws.

While the connection provided in this manner is adequate initially, the connection has a tendency to deteriorate in use, particularly where the use requires a large number of on-off cycles as in signal lamps. This deterioration causes early and unpredictable failure of the lamp.

The deterioration is believed due to a number of factors which revolve around the way the connection is made. The initial bend caused by the clamping jaws tends to have a very short radius of curvature, as compared to the coil diameter of the filament, and the subsequent bending about the filament tends to produce a non-uniform radius of curvature, resulting in what may be visualized in cross section as a D circumscribing a circle.

Since the clamping operation produces a non-uniform radius of curvature, the filament usually contacts the hook in three places: one on the straight portion and two along the curved portion. These points are not consistent from one connection to the next since the filament does not contact the hook at the top or bottom of the D. If the hook is not precisely controlled, a loose coil may result.

Loose coils also result from variation in what is known in the art as "clamping pressure", expressed as a percent. Clamping pressure is the percent reduction in the diameter of the filament coil as the result of clamping. For example, a coil having a nominal diameter (in inches) or fifteen thousandths reduced to ten thousandths is considered subjected to a clamping pressure of 33 percent. With the hooks of the prior art, this clamping pressure is difficult to control and to measure.

The flattening of the lead wire, prior to clamping, and the clamping operation itself causes work hardening of the lead wire at the point of connection. When the lamp is in use, the heat from the filament anneals the lead wire hook, causing it to relax its grip on the filament. Further, since the lead wire contacts the filament in only three places, the heat is greatly concentrated at these points of contact, which makes the lead wire much softer at these points. As the lead wire relaxes its grip, a gap may form causing a destructive arc at what was once the contact point. Also, as the lamp is cycled on and off, the heating and cooling fatigues the lead wire hook, thereby loosening it.

In addition, the apparatus of the prior art, in using the filament as an anvil, introduces irregularities, e.g., changes in coil pitch, in the filament such that the filament is not orthogonal to the lead wire. This is undersirable as it causes stresses in the filament which may lead to premature failure.

SUMMARY OF THE INVENTION

In view of the foregoing, it is therefore an object of the present invention to provide apparatus for making an improved filament clamp.

Another object of the present invention is to provide means for attaching the lead wire substantially around the circumference of a filament.

A further object of the present invention is to eliminate hot spots in the connection between a lead wire and a filament.

Another object of the present invention is to provide a lead wire with a hook of substantially uniform diameter.

A further object of the present invention is to provide means for connecting a lead wire to a filament such that the filament remains orthogonal to the lead wire.

Another object of the present invention is to provide more accurate control of clamping pressure.

The foregoing objects are achieved in the present invention wherein a three jaw hook former curves the flattened end of the lead wire about an anvil having a curved portion of approximately the same radius as the filament. Another portion of the anvil forms a straight tail section from the end of the lead wire. After the hook is thus formed, the filament is inserted and the lead is closed about the filament between forming dies, the face of each die being shaped complementary to the final shape of the filament and the attached lead. In closing about the lead and filament, one of the dies engages the end of the tail portion of the hook to close the hook about the filament without using the filament as an anvil.

BRIEF DESCRIPTION OF THE DRAWINGS

A more complete understanding of the present invention can be obtained by considering the following detailed description in conjunction with the accompanying drawings, in which:

FIGS. 1A–F illustrate lead fastening apparatus of the prior art.

FIGS. 2A–F illustrate lead fastening apparatus in accordance with the present invention.

FIG. 3 illustrates a filament attached to a lead in accordance with the present invention.

DESCRIPTION OF THE PREFERRED EMBODIMENTS

FIGS. 1A–F illustrate the sequence of steps utilized in the prior art for fastening the lead wire to a filament. For the sake of clarity, filament and lead wire manipulating apparatus is not shown since it is well known in the art how these operations are performed. The steps illustrated in FIGS. 1A–F represent the operations at sequential index positions of the stem-making machine on one end of the filament. The other end of the filament is clampled in the same manner, and, as well known in the art, support wire(s) are subsequently added and the leads and support wire(s) inserted into the softened glass stem.

Considering FIG. 1A, lead wire 10 has the end portion thereof flattened and inserted between jaws 11 and 12 for an initial bending to form a V-shaped hook. Jaws 11 and 12 are used throughout the lead fastening operation, closing stepwise at each index position. One of the jaws, for example, jaw 12, has a relief 13 formed therein for clearing the lead wire and filament at the end of the operation. As illustrated in FIG. 1B, lead wire 10 is bent over a relatively short radius of curvature as compared to the radius of curvature of the filament, forming the V. After the initial compression, the jaws stop and filament 15 is inserted, as illustrated in FIG. 1C.

Jaws 11 and 12 are further closed (FIG. 1D) causing the end of lead wire 10 to contact the straight portion thereof. As jaws 11 and 12 further close, as illustrated in FIG. 1E, the filament is used as an anvil for curving lead wire 10 and, in the process, is slightly deformed. As jaws 11 and 12 close, the end portion of lead wire 10 is bent in one direction, utilizing the straight portion of lead wire 10 for one support and the filament for another. At the same time, the bent portion of lead wire 10 is formed around filament 15 utilizing filament 15 for support.

FIG. 1F illustrates jaws 11 and 12 fully closed about filament 15 and lead wire 10. Due to the irregularity of the curvature of the hook thus formed, the filament coil is clamped in only three places by the hooked end of lead wire 10. Most coils do not touch the bottom of the hook or the closed end of the hook, even though there is some compression and deformation of the filament coil.

FIGS. 2A–F illustrate the steps utilized in attaching lead wires in accordance with the present invention. FIG. 2A illustrates the end portion of a lead wire 20, which has been flattened, for example, by rolling or compressing between jaws having flat faces. The flattened lead wire is then inserted into a hook former comprising jaws 21, 22 and 23. Jaw 21 comprises what is known as a half funnel for receiving the lead wire from the flattening operation and guiding it into position for hook forming. Jaw 22 comprises a shaped anvil having a curved portion or bead 24 and first and second flat sides 25 and 29. Sides 25 and 29 are not parallel, tapering together toward bead 24. In a preferred embodiment of the present invention, side 29, which faces jaw 21, tangentially intersects bead 24. It is also preferred that the diameter of the bead, which approximates the diameter of the coiled filament, be greater than the spacing of sides 25 and 29 at their intersection with bead 24.

Jaw 23, which may, for example, comprise a quarter section of a round rod, acts as a wiper and revolves about the curved portion of jaw 22 while rotating to bend the flattened end of lead wire 20 about jaw 22. The face of jaw 23 in contact with lead wire 20 is flat and upon completion of rotation causes the lead wire to contact face 25 of jaw 22.

FIG. 2C illustrates the resulting hooked lead wire, having a shape reminiscent of a shepherd's crook. Specifically, lead wire 20 comprises a flattened end having a curved portion 26, curving out of the plane of the flattening, and a straight end portion 27, bent oppositely to the curved portion 26; the combined lengths of said curved and straight portions being greater than the circumference of the filament. In contrast with the prior art, the hooked lead wire produced thus far has a relatively uniform radius of curvature for the portion to receive the filament and has not been formed about a filament, possibly deforming it.

After the hooked lead wire has been formed, it is removed from the hook-forming mechanism comprising jaws 21, 22 and 23. The formed hook is then presented to the clamping unit, and the filament coil is inserted into the interior curve of the hook, i.e., the inside of curved portion 26, with straight end portion

27 serving as a guide for the filament. As is apparent from a comparison of the respective figures, the apparatus of the present invention utilizes separate hook-forming and clamping units as compared to the single set of dies used in the prior art. Further, the clamping pressure is much more easily controlled with the apparatus of the present invention. Specifically, considering FIG. 2D, by varying the thickness of the flattened end of lead wire 20, the inside diameter of the hook is varied. The outside diameter of the hook does not vary by virtue of the forming dies, illustrated in FIGS. 2E and 2F.

Forming dies 31 and 32 have cavities 33 and 34 in the mating faces thereof shaped complementary to the final shape of the filament and attached lead. As forming dies 31 and 32 close about lead wire 20 and filament 28, the end of straight portion 27 engages a vertical slot 35 in cavity 34 pushing the straight portion of the flattened end of lead wire 20 into a corresponding slot in cavity 33. It is preferred that die 32 be identical to die 31; specifically, that slot 35 extend upward to the upper edge of die 32. Straight end 27 is thus shorter than the length of slot 35 and has a degree of freedom in the die, allowing movement of the wire during the forming operation. The dies otherwise close tightly around the lead wire and filament, thereby providing accurate diameter control. Since cavities 33 and 34 contain curved portions for the filament with the lead around it and slot 35 allows lengthwise motion of the lead wire, the flattened lead is deformed and the hook in the lead wire is closed without excessive pressure on filament 27, and particularly, without utilizing filament 27 as an anvil.

FIG. 2F illustrates dies 31 and 32 fully engaged about lead wire 20 and filament coil 28. In contrast with the prior art, the hook portion of lead wire 20 substantially encircles filament coil 28 providing contact over a large proportion of the circumference thereof. This provides both good electrical contact and good mechanical contact, which prevents hot spots during the operation of the filament. In addition, clamping pressure is more accurately controlled since the lead wire conforms to the dies and has a predetermined thickness.

FIG. 3 illustrates a finished lead wire clamped to a filament. While the coils of filament 28 are slightly compressed in the clamp, they are not deformed as demonstrated by filaments attached in accordance with the present invention extending orthogonally from lead wire 20.

Having thus described the invention, it will be apparent to those of skill in the art that various modifications can be made within the spirit and scope of the present invention. For example, while jaw 23 is described as rotating and revolving about bead 24, it is understood that motion is relative, i.e., jaws 21 and 22 could rotate and revolve instead. Also, while described in conjunction with a single coil filament, coiled-coil filaments and the tails of high wattage filaments may be clamped as well. The limitation on clamping to the tail of a filament, i.e., a straight wire segment, is the radius of curvature that must be formed in the end of the lead wire. By way of example only, as in side diameter of 0.005 inches is believed a practical minimum, i.e., attainable without additional processing of the lead wire.

What we claim as new and desire to secure by Letters Patent of the U.S. is:

1. A method for attaching a coiled filament to a lead wire for use in an electric lamp comprising the steps of:
forming an open hook having a uniformly curved portion and a straight end portion in one end of said lead wire, the combined lengths of said straight end portion and said uniformly curved portion exceeding the circumference of said filament;
loading said filament into said hook; and
closing said uniformly curved portion about said filament, using said end portion, so that said filament extends orthogonally from said hook.

2. The method as set forth in claim 1 wherein said forming step comprises:
holding said lead wire between two jaws of a first set of dies; and
partially wrapping said lead wire around one of said jaws with a third revolving jaw.

3. The method as set forth in claim 2 wherein said closing step comprises the step of compressing said hook between forming dies which initially engage said straight end portion to close said uniformly curved portion about said filament.

4. The method as set forth in claim 3 and comprising as an initial step:
flattening the end portion of said lead wire to a predetermined thickness; and wherein said hook is formed in a direction out of the plane of said flattening.

5. A machine for clamping a lead wire to a filament for use in an incandescent lamp comprising:
three jaw means for forming an open hook having a uniformly curved portion in said lead wire, one of the jaws of said means revolving about a second of said jaws; and forming dies for clamping said hook about said filament.

6. The machine as set forth in claim 5 wherein said one of said jaws comprises a quarter-round rod and said second of said jaws comprises a rod having non-parallel, flat sides and a bead running the length thereof about which said one jaw bends said lead wire.

7. The machine as set forth in claim 6 wherein said non-parallel, flat sides taper together at said bead, said bead having a diameter greater than the spacing of said sides at the intersection with said bead.

8. The machine as set forth in claim 7 wherein said bead has a diameter approximately the same as the diameter of said filament and wherein one of said non-parallel, flat sides tangentially intersects said bead.

9. The machine as set forth in claim 8 wherein the third of said jaws comprises a half funnel for receiving said lead wire.

10. The machine as set forth in claim 6 wherein said forming dies comprises first and second dies having cavities in the mating faces thereof, said cavities shaped complementary to the volume occupied by said lead and filament as clamped together.

11. The machine as set forth in claim 10 wherein the mating surfaces of said first and second dies are identical.

12. An improved electric lamp having a light-transmitting envelope, a base, a filament, and conductive leads connecting said base to said filament, wherein the improvement comprises:
said conductive leads having flattened and uniformly curved end portions wrapped around the ends of said filament contacting said filament substantially about a single circumference thereof, and extending orthogonally from said filament.

* * * * *